United States Patent
Arnold

[11] 3,921,672
[45] Nov. 25, 1975

[54] CHOKE FOR CONTROLLING FLOW OF PRESSURIZED FLUID

[75] Inventor: James F. Arnold, Houston, Tex.

[73] Assignee: HydroTech International, Inc., Houston, Tex.

[22] Filed: July 1, 1974

[21] Appl. No.: 484,793

[52] U.S. Cl. .................... 138/42; 138/44
[51] Int. Cl.² ........................... F15D 1/02
[58] Field of Search .................. 138/42–45

[56] References Cited
UNITED STATES PATENTS

| | | | |
|---|---|---|---|
| 1,883,720 | 10/1932 | Grimes | 138/42 X |
| 2,094,222 | 9/1937 | Smith | 138/42 X |
| 2,096,021 | 10/1937 | Aherne | 138/42 X |
| 2,193,725 | 3/1940 | Heigis | 138/40 |
| 2,210,480 | 8/1940 | Brice | 138/42 |
| 2,243,592 | 5/1941 | Wolf | 138/42 X |
| 2,501,593 | 3/1950 | Becker | 138/44 |
| 2,762,397 | 9/1956 | Miller | 138/43 |
| 2,924,441 | 2/1960 | Osborne | 138/44 X |
| 3,072,261 | 1/1963 | Smith | 138/42 X |
| 3,156,262 | 11/1964 | Attebo | 138/43 |
| 3,789,880 | 2/1974 | Armstrong et al. | 138/42 X |

Primary Examiner—John W. Huckert
Assistant Examiner—Charles Gorenstein

[57] ABSTRACT

A choke and method for controlling pressurized fluid flow such as natural gas being produced from a gas well. The choke includes a choke body having a threaded portion for mounting in a fluid conduit for fluid flow therethrough. The body has an inlet end which is provided with a plurality of orifices for receiving the gas with the orifices being positioned such that the discharge ends thereof are in generally proximate and generally opposed relationship, whereby the gas streams discharging therefrom inpinge against each other to create a collision zone generally proximate the orifices. The body also has an outlet including a portion forming a bore extending downstream from the collision zone for discharging the gas downstream in the conduit after passage thereof through the zone. Preferably the bore has a cross-sectional area greater than the sum of the cross-sectional areas of the inlet orifices.

9 Claims, 4 Drawing Figures

U.S. Patent  Nov. 25, 1975  3,921,672
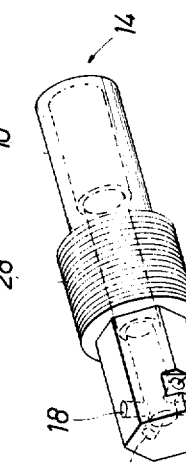
FIG.1
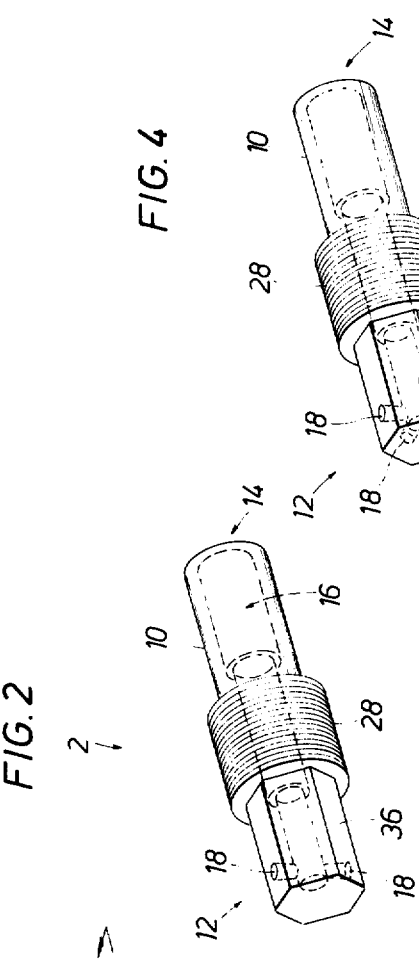
FIG.2
FIG.4
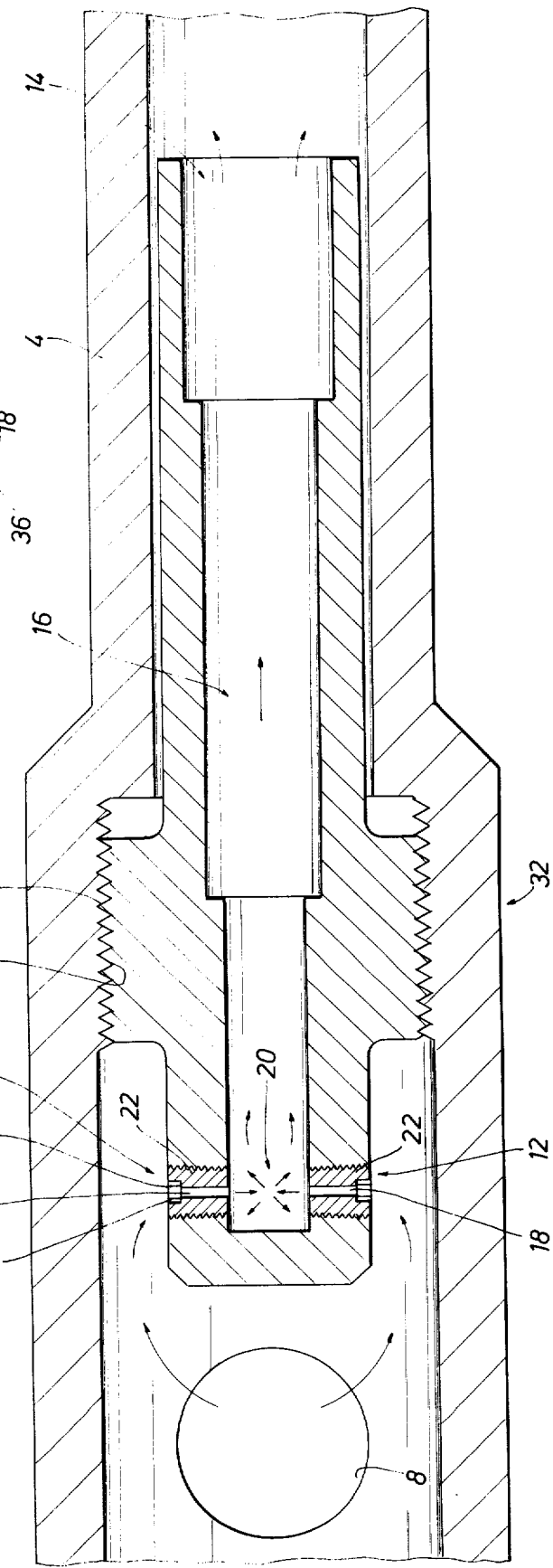
FIG.3

3,921,672

CHOKE FOR CONTROLLING FLOW OF PRESSURIZED FLUID

BACKGROUND OF THE INVENTION a. Field of the Invention

This invention relates broadly to a choke for controlling the flow of a pressurized fluid through a conduit and, in particular, to an improved choke of this type which is especially adapted to pressurized fluids carrying a potentially freezable substance such as water vapor, for example. This invention has particular application as a choke in a flowline extending from a well head tapped in turn to a pressurized gas reservoir where the choke is ordinarily located at or near the well head to restrict the volumetric flow of the gas flowing from the reservoir and through the flowline.

b. Description of the Prior Art

Under certain circumstances, it has been found that prior art chokes used in controlling flow in such gas lines tend to "freeze", with consequent stoppage of the gas flow through the choke main body. Prior art literature teaches that when the flowing medium from such a reservoir constitutes a highly pressurized natural gas carrying a potentially freezable substance such as water vapor, for example, then some of the water vapor may condense out of the gas in the form of ice (or hydrocarbon hydrates) as it passes through the axial bore of the choke body. It is presently believed that the ice in turn accumulates in sufficient quantities around the choke bore, particularly on its downstream side, blocking passage of gas therethrough to resultantly "freeze" the choke.

The term "freezing" within the context of this application shall be construed to mean the plugging of the choke with ice to block or at least resist fluid flow therethrough. It is postulated that the freezing phenomena occurs because of the drop in gas pressure on the downstream side of the choke and the ensuing drop in downstream gas temperature as calculated from the ideal gas equation:

$$\frac{P_u V_u}{T_u} = \frac{P_d V_d}{T_d}$$

$V_u$ = Gas Volume Flowing Upstream of Choke
$V_d$ = Gas Volume Flowing Downstream of Choke
$V_u = V_d$ = Constant
$P_u$ = Gas Pressure Upstream of Choke
$P_d$ = Gas Pressure Downstream of Choke
$P_u > P_d$
$T_u$ = Gas Temperature Upstream of Choke
$T_d$ = Gas Temperature Downstream of Choke
$T_u > T_d$ More particularly, it is presently believed that as the flowing gas pressure drops from the high upstream pressure $P_u$ to the ordinarily much lower downstream pressure $P_d$ then the downstream temperature $T_d$ will also drop to subfreezing levels to freeze the water which condenses out of the gas; the frozen water or ice accumulating around the choke bore to freeze the choke.

SUMMARY OF THE INVENTION

It is therefore an object of this invention to provide an improved choke and method which overcomes the aforesaid problems. The invention as visualized herein seeks broadly and generally to provide an improved choke and method which will overcome choke freezing, given the same flowing medium aforementioned, to so enable continuous gas flow through a conduit.

To achieve the foregoing and other obvious objects of the invention, both stated and unstated hereinafter, the invention provides a choke and method for restricting the volumetric flow of a pressurized fluid through a conduit. The choke includes a main body having an inlet and outlet respectively disposable in the upstream and downstream flow of the pressurized fluid through the conduit and an internal passageway connecting the inlet and outlet in flow-through relation. The inlet includes at least two ports or orifices angularly disposed relative to each other and converging towards a substantially common zone of collision within the passageway whereby pressurized fluid flowing through the ports will converge and impinge at the zone and flow downstream through the passageway and outlet. It is to be understood that the zone of collision is substantially proximate to the discharge ends of the ports so that the effects of said zone of collision will maintain the ports clear of the freezing condition described above.

Although the fluid mechanics within the choke according to the present invention are not precisely known to the inventor, field tests performed on the choke have nevertheless shown that, given the same flowing medium aforementioned, the choke does not freeze even though the temperature $T_d$ on the downstream side of the choke may drop to subfreezing levels.

The method of this invention pertains to controlling the flow of a stream of pressurized gas such as gas in a gas conduit connected to a gas well. It includes the combination of steps comprising separating the gas stream into a plurality of gas streams by flowing the initial gas stream through a plurality of restricted orifices. The separated streams are then impinged against each other in a common zone of collision generally proximate the discharged ends of the orifices. Further, the volume of the gas is expanded after passage thereof through the orifices. Preferably, the impinging step is carried out by impinging or impacting the separated streams together by flowing them from generally opposed directions.

Other objects of the invention more or less broad than the foregoing will become apparent from the hereinafter following description of the elements, parts and principles of the invention given herein solely by way of example and with reference to the accompanying drawing wherein like reference numerals refer to like parts of the invention.

BRIEF DESCRIPTION OF THE DRAWING

FIG. 1 is a perspective view of the choke installed in a flowline extending from and in flow-communication with a well head.

FIG. 2 is an isometric view of the choke body.

FIG. 3 is a cross-sectional view of the choke taken generally along line 3—3 of FIG. 1.

FIG. 4 is an isometric view of an alternative embodiment of the choke of this invention having an inlet with four ports or orifices.

DESCRIPTION OF THE PREFERRED EMBODIMENT

One presently preferred embodiment of the invention is illustrated generally in FIG. 1. As shown therein, choke 2 is removably installed in a conduit or flowline 4 in a manner to be described hereinafter; flowline 4 being in flow-communication with a well head 6 through port 8. Well head 6 is tapped in turn to a pressurized natural gas reservoir (not shown) with choke 2 serving to restrict the volumetric flow of the pressurized gas flowing from the reservoir and through flowline 4.

Choke 2 includes a main body 10 as best shown in FIG. 2 having inlet means including inlet 12 and an outlet means including outlet 14 respectively disposable in the upstream and downstream flow of the pressurized gas through flowline 4, as made apparent from FIGS. 1 and 3. Body 10 is provided with an internal bore or passageway 16 forming a part of the outlet means and connecting inlet 12 and outlet 14 in flow-through relation. Passageway 16 is preferably provided with internal cross-sectional dimensions which progressively increase from inlet 12 towards outlet 14. Preferably, the central axes of the bores of orifices 18 are generally transverse to bore or passageway 16. Also, the cross-sectional area of passageway 16 downstream of orifices 18 will be greater than the sum of the cross-sectional areas of orifices 18, to permit expansion and hence pressure drop through the choke.

Inlet 12 includes at least two orifices 18 angularly disposed relative to each other and converging towards a substantially common zone 20 within said passageway 16 whereby upstream gas flowing therethrough converge and impinge together at zone 20, as exemplified by the arrows in FIG. 3, and flow downstream through passageway 16 and outlet 14. Preferably, orifices 18 are disposed in generally mutually opposed relationship (FIG. 3) and generally proximate each other, enabling the two streams of fluid flowing therethrough to converge and collide head-on proximate the discharge ends of the orifices.

It should be understood that inlet 12 can also include additional orifices 18. For example, in the embodiment shown in FIG. 4 inlet 12 is shown with four orifices 18 in flow-communication with and radially spaced about passageway 16. These four orifices 18 are also angularly disposed relative to each other and converge towards a substantially common zone 20 within passageway 16, enabling the pressurized fluid flowing therethrough to converge and collide at zone 20 in a manner similar to the choke shown in FIG. 2.

Under certain circumstances it may become desirable and indeed necessary to vary the volumetric flow of the pressurized fluid through flowline 4. To this end, the invention contemplates that the orifices may be provided by removable or replaceable flow beans 22 mounted in main body 10 as shown in FIG. 3. Since flow beans 22 are removable, this permits installation of other flow beans 22 having different bore sizes. In order to facilitate threaded engagement and disengagement between said flow beans 22 and main body 10, the radially outward ends thereof are provided with enlarged recesses 24 having a polygonal shaped interior wall 26 mateable with a like-shaped installation tool such as an Allen wrench which is to rotate flow beans 22 in conventional manner. Accordingly, it will be understood that the volumetric flow of the gas through said inlet 12 may be increased or decreased by merely changing the size of flow beans 22 to ones having larger or smaller bore sizes as desired.

It will be appreciated that the pressurized gas will impart high frictional forces to main body 10 and flow beans 22 while flowing therethrough. As a result, main body 10 and flow beans 22 are preferably formed from a hard metal such as tungsten carbide or an appropriate equivalent to withstand such frictional forces.

Turning now to the installation of choke 2 in flowline 4, it will be recognized from FIG. 3 that choke 2 includes external threads 28 mateable with threads 30 on the interior surface of choke housing 32 forming part of flowline 4. Housing 32 is provided with removable end cap 34 (FIG. 1) threadedly engaged therewith, enabling access to the interior of housing 32 and choke 2. Choke 2 in turn preferably includes a polygonal shaped exterior 36 at the inlet end which is mateable with a like-shaped installation tool (not shown), the latter serving to facilitate threaded engagement and disengagement between choke 2 and housing 32. It will be understood, of course, that said well head 6 and flowline 4 include appropriate valving (not shown) to isolate housing 32 from fluid flow so that choke 2 may be installed therein as aforesaid.

By way of brief summary, the invention visualizes providing a choke of the character described in which at least two inlet ports or orifices 18 are angularly disposed relative to each other and converge towards a substantially common zone 20 within passageway 16. As a result, gas entering into flowline 4 through opening 8 located upstream of choke 2 will be separated by orifices 18 into two volumetrically restricted gas streams angularly discharged relative to each other to converge and collide at a substantially common zone 20 in passageway 16 in the downstream flow of the gas through flowline 4.

The method of this invention relates to restricting the volumetric flow of gas through a conduit connected as, for example, to a natural gas well, which gas well might also be simultaneously producing some water vapor therewith. The method contemplates separating the stream containing the mixture of natural gas and water vapor into a plurality of separate streams by flowing the stream through a plurality of restricted orifices, such as orifices 18 described above. The separated streams are thereafter impinged against each other in a common zone of collision, such as zone 20, described above, which zone is generally proximate the discharged ends of orifice 18 and with discharges being from generally opposed directions. The method also contemplates expanding the volume of the gas after passage therethrough the orifices, such that the gas stream undergoes a pressure drop. It is believed that the aforesaid impinging creates conditions which prevent the aforesaid freezing problem discussed above. As discussed above also, it is to be understood that the general direction of the discharge of the separated streams which are being impinged together will generally be transverse or will be preferably generally transverse to the flow of the gas downstream therefrom.

In one test installation using a conventional positive choke in a gas flowline connected to a gas well, the choke "froze" after about 5 minutes of operation. The choke used had an axial bore which was 6/64 inches in diameter (or a cross-sectional area of 0.00690 square inches). The upstream pressure in the gas line was 1400 P.S.I. and the diameter of the line was two inches. The downstream pressure after passage through the choke was 70 P.S.I.

Thereafter, a choke body of the type shown in FIGS. 2 and 3 was placed in the same flowline as a replacement for the aforesaid positive choke. This choke body had two opposed orifices, each of which was 4/64 inches in diameter (or a total cross-sectional area of 0.00612 square inches). The standoff distance between the discharge ends of the orifices was one-half inch. Otherwise, the conditions were substantially the same, with an upstream pressure of 1400 P.S.I. and downstream pressure was reduced to 70 P.S.I. The choke body of this invention operated satisfactorily over a period of two hours without any "freeze up".

It is to be understood that in practicing this invention, different sized orifices will be required to accommodate different upstream pressures and to produce the desired downstream pressure, as is well known to those skilled in the art.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A choke for controlling the flow of a pressurized gas in a conduit from a high upstream pressure to a lower downstream pressure and wherein the pressurized gas includes a freezable substance entrained therein which forms ice on the downstream side of the choke in response to the gas undergoing a pressure drop across the choke, which ice is capable of accumulating in sufficient quantities to block passage of the gas through the choke, said choke comprising:

a choke body having inlet means for receiving the pressurized gas and outlet means of larger cross section than said inlet means for permitting expansion of said gas and for discharging said gas at a lower downstream pressure;

said inlet means including at least two orifices, each orifice being arranged for passage of a portion of said gas therethrough to a lower pressure zone within said larger outlet means, said orifices being positioned in said body such that the discharge ends thereof are angularly aligned relative to each other to thereby cause the streams discharging from said orifices to impinge against each other in said lower pressure zone generally proximate the points of discharge from said orifices whereby said freezable substance is precluded from accumulating in the form of ice in sufficient quantities to block passage of the gas through the choke.

2. The invention as claimed in claim 1 wherein: said discharge ends of said orifices are aligned in mutually opposed relationship.

3. The invention as claimed in claim 1 wherein: said outlet means is in the form of a bore extending downstream from said orifices.

4. The invention as claimed in claim 1 wherein: each of said orifices is formed by a flow bean mounted in said body.

5. The invention as claimed in claim 1 wherein: said body includes two pairs of inlet orifices, with each member of a pair arranged for having the stream discharging therefrom impinge against the stream discharging from the other orifice in said pair.

6. The invention as claimed in claim 1 wherein: said outlet means is in the form of a bore extending downstream from said orifices; and the central axes of the bores of said orifices are generally transverse to the central axis of said outlet bore.

7. A choke for controlling the flow of a pressurized gas in a conduit from a high upstream pressure to a lower downstream pressure and wherein the pressurized gas includes a freezable substance entrained therein which forms ice on the downstream side of the choke in response to the gas undergoing a pressure drop across the choke, which ice is capable of accumulating in sufficient quantities to block passage of the gas through the choke, said choke comprising:

a choke body having an inlet and outlet respectively disposable in the upstream and downstream flow of the pressurized gas through the conduit, and an internal passageway connecting said inlet and outlet in flowthrough relationship;

said inlet being of smaller cross section than said passageway and outlet, and including at least two orifices having axes angularly disposed relative to each other and converging towards a substantially common zone of collision generally proximate said orifices and within said passageway to thereby permit gas streams flowing through said orifices to undergo a pressure drop and converge and collide at said zone whereby said freezable substance is precluded from accumulating in the form of ice in sufficient quantities to block passage of the gas through the choke.

8. A choke for controlling the flow of a pressurized gas in a conduit from a high upstream pressure to a lower downstream pressure and wherein the pressurized gas includes a freezable substance entrained therein which forms ice on the downstream side of the choke in response to the gas undergoing a pressure drop across the choke, which ice is capable of accumulating in sufficient quantities to block passage of the gas through the choke, said choke comprising:

a choke body having means for mounting in said conduit for gas flow therethrough;

said body having inlet means including a portion having at least two orifices for receiving said gas, said orifices being positioned such that the discharge ends thereof are in generally proximate and generally opposed relationships, whereby gas streams discharging therefrom impinge against each other to create a collision zone generally proximate said orifices;

and said body having outlet means including a portion forming a bore extending downstream from said collision zone for discharging said gas downstream in said conduit after passage thereof through said zone, said bore having a cross-sectional area greater than the sum of the cross-sectional areas of said orifices enabling said gas streams to undergo a pressure drop at said zone, whereby said freezable substance is precluded from accumulating in the form of ice in sufficient quantities to block passage of the gas through the choke as aforesaid.

9. In a pressurized flow system including a choke for controlling the flow from a high upstream pressure to a lower downstream pressure and wherein the flowing medium constitutes a highly pressurized gas having a freezable substance entrained therein which forms ice on the downstream side of the choke in response to the gas undergoing a pressure drop across the choke, which ice is capable of accumulating in sufficient quantities to block passage of the gas through the choke, the improvement in the choke comprising:

a choke body having inlet means for receiving the pressurized gas and outlet means of larger cross section than said inlet means for discharging said gas at a lower downstream pressure;

said inlet means including at least two orifices, each orifice being arranged for passage of a portion of said gas therethrough to a lower pressure zone within said larger outlet means, said orifices being positioned in said body such that the discharge ends thereof are angularly aligned relative to each other to thereby cause the streams discharging from said orifices to impinge against each other in said zone generally proximate to the points of discharge from said orifices whereby said freezable substance is precluded from accumulating in the form of ice in sufficient quantities to block passage of the gas through the choke as aforesaid.

\* \* \* \* \*